(12) United States Patent
Cortequisse

(10) Patent No.: US 8,636,466 B2
(45) Date of Patent: Jan. 28, 2014

(54) SEGMENTED COMPOSITE INNER FERRULE AND SEGMENT OF DIFFUSER OF AXIAL COMPRESSOR

(75) Inventor: Jean-François Cortequisse, Heers (BE)

(73) Assignee: Techspace Aero S.A., Herstal (Milmort) (BE)

( * ) Notice: Subject to any disclaimer, the term of this patent is extended or adjusted under 35 U.S.C. 154(b) by 441 days.

(21) Appl. No.: 12/635,071

(22) Filed: Dec. 10, 2009

(65) Prior Publication Data

US 2010/0150708 A1  Jun. 17, 2010

(30) Foreign Application Priority Data

Dec. 11, 2008 (EP) ..................................... 08171385

(51) Int. Cl.
*F01D 9/04* (2006.01)

(52) U.S. Cl.
USPC ........... 415/138; 415/139; 415/191; 415/200; 415/209.4; 415/174.4; 415/174.5

(58) Field of Classification Search
USPC ................. 415/138–139, 189–190, 191, 200, 415/208.1, 208.2, 209.2–209.4, 210.1, 415/174.4, 174.5, 173.7
See application file for complete search history.

(56) References Cited

U.S. PATENT DOCUMENTS

| | | | | |
|---|---|---|---|---|
| 890,635 | A * | 6/1908 | Fox | 415/139 |
| 2,771,622 | A * | 11/1956 | Thorp, II | 415/209.4 |
| 3,849,023 | A * | 11/1974 | Klompas | 415/173.7 |
| 4,295,785 | A * | 10/1981 | Lardellier | 415/139 |
| 4,395,195 | A | 7/1983 | De Cosmo et al. | |
| 4,767,267 | A * | 8/1988 | Salt et al. | 415/173.7 |
| 4,820,120 | A * | 4/1989 | Feuvrier et al. | 415/189 |
| 5,399,069 | A * | 3/1995 | Marey et al. | 415/209.3 |
| 5,482,433 | A * | 1/1996 | Norris et al. | 415/210.1 |
| 6,425,738 | B1 * | 7/2002 | Shaw | 415/208.1 |
| 6,821,087 | B2 * | 11/2004 | Matsumoto et al. | 415/191 |
| 7,086,831 | B2 * | 8/2006 | Harper | 415/209.3 |
| 7,147,434 | B2 * | 12/2006 | Mons et al. | 415/200 |
| 7,322,796 | B2 * | 1/2008 | Pietraszkiewicz et al. | 415/191 |
| 7,581,924 | B2 * | 9/2009 | Marini et al. | 415/191 |

FOREIGN PATENT DOCUMENTS

| | | |
|---|---|---|
| CH | 238024 | 9/1945 |
| CH | 398645 A1 | 3/1966 |
| EP | 0277884 A2 | 8/1988 |

(Continued)

OTHER PUBLICATIONS

Search Report for EP 08 17 1385, dated Jul. 10, 2009.

*Primary Examiner* — Christopher Verdier
(74) *Attorney, Agent, or Firm* — James E. Walton; Richard G. Eldredge

(57) ABSTRACT

A ferrule of a stator with blades of an axial turbomachine consists of at least two segments having the general form of an arc of a circle and intended to be arranged end to end, so as to form the ferrule, where each segment contains on its outside a plurality of openings arranged at regular distances along the general arc of the circle of the segment, into each of which fits the end of a blade of the stator. Each end of a segment possesses a section of which the profile essentially corresponds with that of the end of the corresponding blade when the segment is placed on the blades of the stator, such that the joint between two adjacent segments corresponds with the profile of the corresponding blade.

17 Claims, 5 Drawing Sheets

(56) References Cited

FOREIGN PATENT DOCUMENTS

| | | | |
|---|---|---|---|
| EP | 1426559 | A1 | 6/2004 |
| GB | 727608 | | 4/1955 |
| GB | 802508 | A1 | 10/1958 |
| GB | 2037901 | A1 | 7/1980 |
| GB | 2115883 | A | 9/1983 |
| GB | 2314385 | A1 | 12/1997 |

* cited by examiner

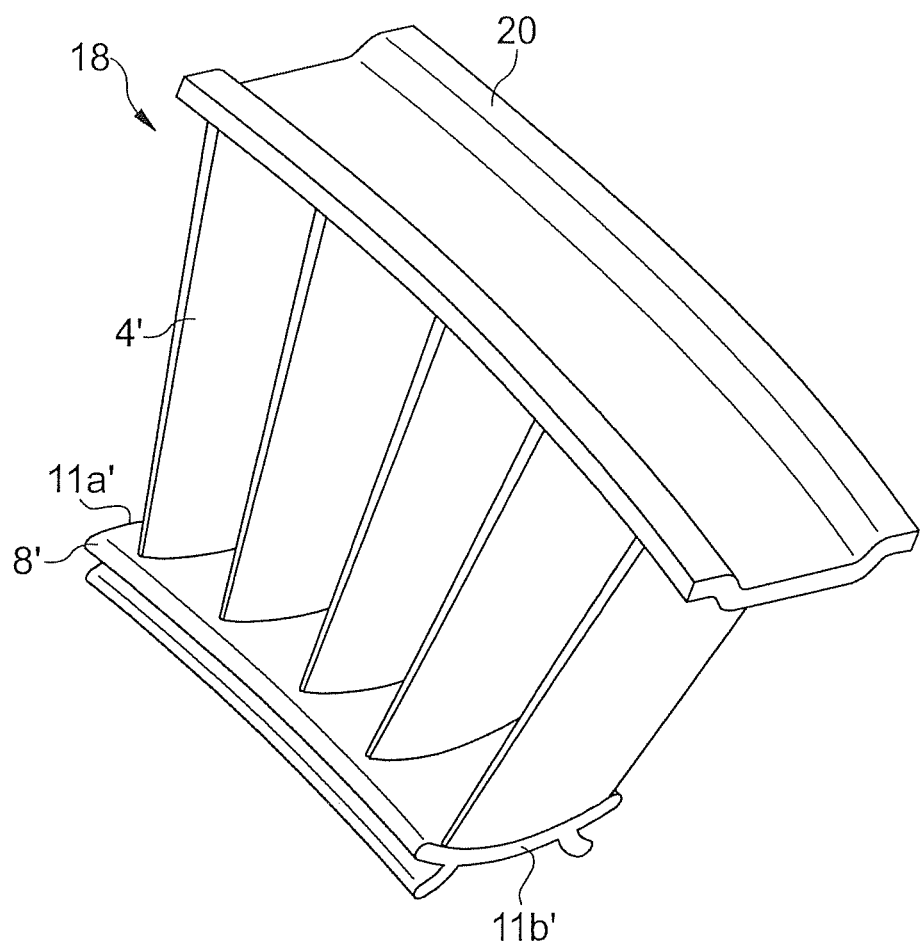

SEGMENTED COMPOSITE INNER FERRULE AND SEGMENT OF DIFFUSER OF AXIAL COMPRESSOR

This application claims priority under 35 U.S.C. §119 to European Patent Application No. 08171385.1, filed 11 Dec. 2008, titled "Segmented Composite Inner Ferrule and Segment of Diffuser of Axial Compressor," which is incorporated herein by reference for all purposes.

BACKGROUND

1. Field of the Application

The present application relates to an internal ferrule of a stator with blades as well as an annular stator of an axial turbomachine, in particular an internal ferrule of a diffuser with blade as well as a diffuser of an axial compressor. Such compressors are typically present in turbojets, turboprops and gas generators.

2. Description of Related Art

An axial compressor typically consists of a series of compression steps, of which each is composed of a circular arrangement of circumferential blades of which the bases are mounted on a rotor. A stator that serves as housing covers the rotor and the blades. The ends of the blades of the rotor move closely to the inside of the stator. Fluid, typically air, is thus moved and compressed along an annular track that is concentric relative to the axis of rotation of the rotor. The rotor thus consists of several rows of circumferential blades at some distance from one another. Rows of attached blades are mounted on the stator between the rows of rotor blades to direct the airflow between the two stages of the compressor. These diffuser blades typically possess an internal inner ferrule at their ends to delimit the primary flux at the lower level. This ferrule typically has an annular shape with an outer surface that is especially profiled to delimit the flux. The outer surface consists of a series of openings into which the ends of the blades fit, of which the base is attached to the stator. This ferrule also ensures "solidarity" among the blades at their ends if these are not free. The inside of the ferrule is covered with a material that is friable or more commonly called abradable. This abradable layer is able to work with one or more vanes on the rotor's circumference by friction to ensure a certain tightness. These vanes are more commonly called "lips" (of a labyrinth seal).

Depending on the dimensions and the used materials and also for reasons of ease of assembly, it may be of interest to segment the ferrule. Indeed, in the case of for example the realization of a ferrule made of a composite material, it may prove to be difficult to inject the resin of a composite material onto the long parts well enough, and hence, segmentation of the ferrule is interesting in view of reducing the length of the segments. Segmentation of the ferrule may also prove to be interesting to compensate for differential expansions at the blades themselves and the parts of the stator that supports the blades.

Document U.S. Pat. No. 4,395,195 discloses an internal ferrule of a compressor of a turbo-engine of which the ferrule is segmented into several sections. The orientation of the blades from the stator is variable so that the coupling between the blades and the ferrule is rotary. The joint between the different outer segments is accomplished between two neighboring blades by means of inner segments in the shape of a "C" of which the opening is directed toward the exterior and into which the outer segments of the ferrule fit (slider). Such a construction is fairly complicated and expensive. Moreover, assembly of the ferrule may prove to take long and therefore be expensive.

Document GB 727,608 discloses an internal ferrule of a stator for a gas turbine consisting of two segments. These two segments are linked with each other by making the end of one slide into the end of the other. These coupling means by means of sliding movement prevent all movement relative to the principal axis of the machine.

Relative to a mono-block ferrule, segmentation of the ferrule, however, has deteriorated aerodynamic properties as a possible disadvantage, notably at the level of the joint. Indeed, depending on the used materials, the precision of the realization and the assembly, the joint between two segments may present a certain projection or misalignment of the joint surfaces which delimits the primary flux.

Although great strides have been made in the area of axial compressors, many shortcomings remain.

DESCRIPTION OF THE DRAWINGS

FIG. 8 is a view of a sector of the diffuser of a compressor in one piece of a composite material according to the present application.

DETAILED DESCRIPTION OF THE PREFERRED EMBODIMENT

Figure 1:
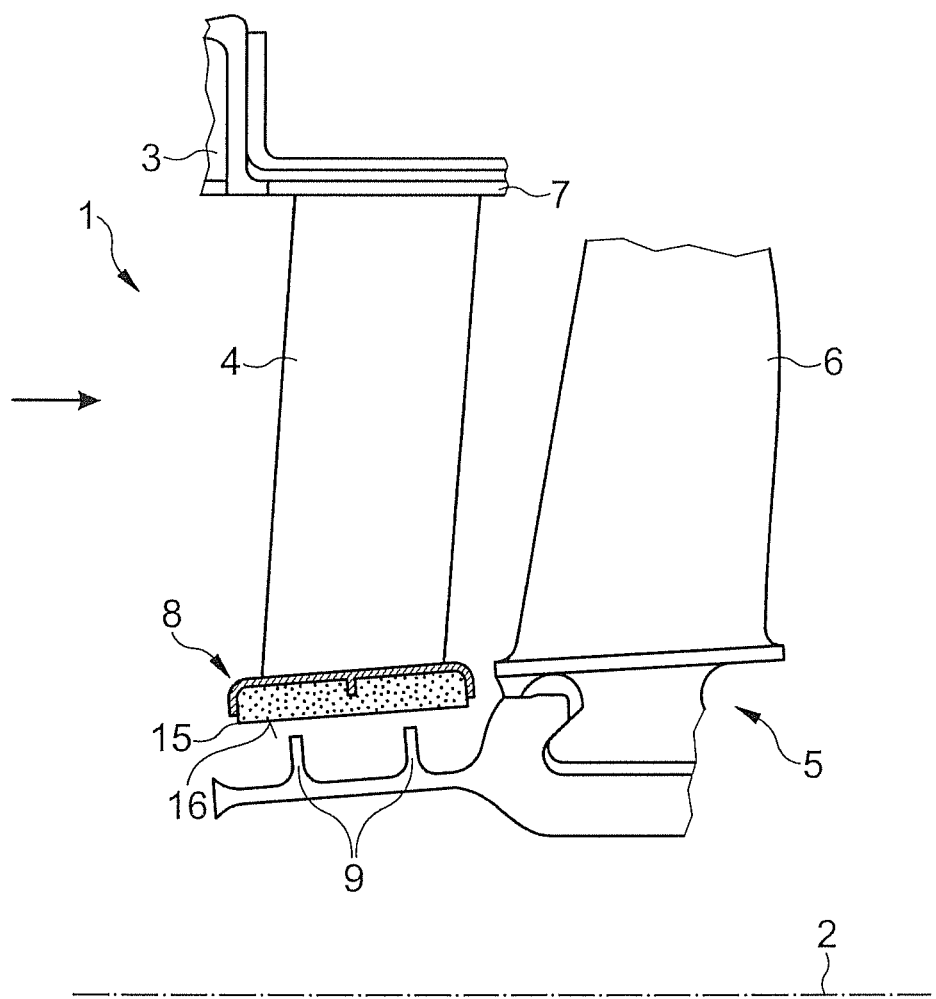
FIG. 1 is a partial cross section of an axial compressor showing among other things an internal inner ferrule according to the present application.

According to a first aspect of the present application, an internal ferrule of a stator with blades of an axial turbomachine is proposed, consisting of at least two segments having the general form of an arc of a circle and intended to be arranged end to end so as to form the ferrule, each segment containing on its outside a plurality of openings at regular distances along the general circle of the segment, each intended to having a stator fit into the end of the blade, each end of the segment consisting of a section of which the profile essentially corresponds with the end of the corresponding blade when the segment is placed on the blades of the stator, such that the joint between two neighboring segments corresponds with the profile of the corresponding blade.

Preferably, the ends of the segments are profiled to fit the blades by way of the joints between the segments when they are placed on the blades of the stator.

Preferably, the segments consist of an upstream and a downstream edge relative to the fluid flow in the turbomachine, the part of the joint that fits around the blade being at some distance from the upstream and the downstream edges.

Preferably, the part of the joint downstream of the blade and/or the part of the joint upstream of the blade consists(s) of a section that is generally aligned with the contours of the blade and forms an angle with the axis of the machine that is greater than or equal to about 30°, preferably greater than or equal to about 60°.

Preferably, the coupling at the joint between the blade and the segments is provided by application of an elastomer during assembly of the segments on the blades.

Preferably, the part of the joint downstream of the blade and/or the part of the joint upstream of the blade consist(s) of connecting means with a positive contact, preferably on each segment on both sides of the joint, the connecting means providing a general connection in the direction that is tangential to the circle of the ferrule.

Preferably, the connecting means with a positive contact are part of the segments on both sides of the joint and are such that they fit together, the sliding movement preferably being generally in the direction of the radius of the segments.

Preferably, the connecting means are of the same material as the segments.

Preferably, the connecting means are envisaged on one portion of the joint which is generally parallel to the upstream and downstream edges of the segments.

Preferably, the connecting means contain at least a projection on a segment and a recess on the neighboring segment, the projection and the recess having geometric shapes that correspond so that the projection can fit together with the recess to provide the coupling; the recess preferably opens up onto one of the inner and outer surfaces of the segment.

Preferably, the joint is such that its profile consists of a central portion that corresponds with the blade, two straight portions in between, on both sides of the central portion and generally parallel to the edges of the segments and consisting of the connecting means, and two portions that extend from the portions in between toward the corresponding edge.

Preferably, the segments are of a composite material, preferably a material containing a resin combined with fibers of carbon and/or iron.

Preferably, the section of a segment has a general U shape of which the open part is directed toward the interior of the circle formed by the segments.

Preferably, the section of the segments contains a base to limit the flow between the blades of the stator, the base consisting of openings into which the ends of the blades fit, every opening extending toward the interior by covering material of the base, the covering material preferably being of the same material as the segment.

According to a second aspect of the present application, an annular stator is proposed with blades of an axial turbomachine, consisting of at least two sectors to be arranged end to end to form the stator, each sector containing an outer segment and inner segment, each segment having the general shape of an arc of a circle corresponding with the outer and inner ring, respectively, of the stator, a plurality of blades arranged between the outer segment and the inner segment along the length of the outer and inner segments, where one of the ends of the inner segment is to the right of the outside of the last blade of the sector on that side, and the other end of the inner segment consists of a section of which the profile essentially corresponds with the outer profile of the blade that is proximal to the adjacent sector, so that the joint between two adjacent sectors corresponds with the outside of the corresponding blade.

FIG. 1 illustrates a view of a portion of an axial compressor, typically of a reaction engine or a turbine engine. The compressor consists of a rotor 5 which turns around axis 2. The rotor consists of a series of blades 6 attached to its circumference, corresponding with a stage of the compressor. The direction and the flowing in direction of the floor and is illustrated by the arrow. The member 3 or again stator of the compressor consists of a series of blades 4 attached at their bases. This series of blades forms a diffuser for the fluid track located between two rows of blades of the moving wheel, the upstream row not being shown. A blade row of the moving wheel and the downstream grille diffuser forms a stage of a compressor. The inside ends of the blades 4 are linked to a ferrule 8. The ferrule has the general shape of a circular ring fitting around the rotor 5. The ferrule 8 thus delimits the lower or inner portion of the annular fluid track that traverse the diffuser. It is kept in place by the blades and provides tightness with the rotor 5. On the inside, the ferrule consists of an abradable layer 15. The rotor 5 consists of two circumferential vanes or more commonly called lips 9 that work together with a layer of friable material 15. The abradable 15 is applied and then machined to provide a surface of tightness 16 that works together with the lips. These materials have friction with the metal of the lips and disintegrate into fine dust if they come into contact with the lips when the rotor is rotating. The lips 9 and the surface 16 of friable material thus form a labyrinth seal.

Figure 2:
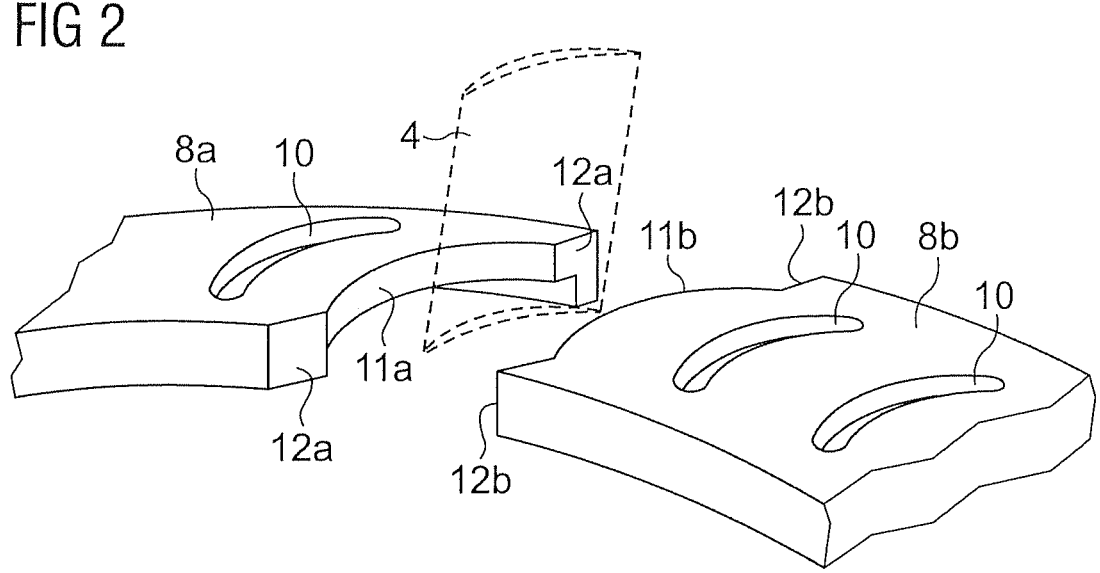
FIG. 2 is a view of a portion of a segmented ferrule according to the present application.

The construction and the assembly of the ferrule according to the invention are illustrated in FIG. 2. The ferrule consists of several segments of which two 8a and 8b are represented in FIG. 2. These segments, in principle, are all similar and in numbers of two or more. The number of segments can be freely chosen on the basis of different criteria such as the diameter of the ferrule to be constructed, the used material and the number of blades of the diffuser. The section of the segments generally has the shape of an inverted "U". It consists of a base that is generally flat as well as profiled aerodynamically, the flat portion forming a circular ribbon while the ferrule is formed by the assembly of all its segments. It consists of an upstream edge and a downstream edge relative to the direction of the fluid flow. Its length, from the upstream edge to the downstream edge, is essentially constant. The section of the segments also consists of two short portions directed toward the bottom or toward the interior of the circular ribbon formed by the base, each being located at the upstream edge or the downstream edge. They are at least approximately perpendicular to said flat portion and of a generally constant height. Together with the inside of said flat part, they form a space or a volume into which a material in liquid or paste form of the type glue or elastomer and/or a friable material can be applied.

Each segment 8a, 8b possesses openings 10 carried out in the surface of said flat portion. These openings slide along the length of the arc of the circle described by the segments. The spacing between the openings is dictated by the position of the blades, the latter being rigidly attached or embedded in the stator. Typically, each blade possesses at its high end a base forming a flat shape, this flat shape being positioned into an opening corresponding with the stator and to be connected there by soldering. The blades are typically all identical and spaced at constant distances along the periphery of the stator and the ferrule. Other arrangements are, however, possible and do not change the principle of the invention. The profile of the openings corresponds with the profile of the blades at the ferrule, and that is, lower side of the blades. A certain tolerance is, however, envisaged which allows easy placement of the segments on the blades. The dimensions of the segments of the ferrule are such that the lower ends of the blades can penetrate the openings 10 during placing of the segments so as to form the ferrule. Depending on the chosen design, the ends of the blades may be flush with the surface of the inside of said flat portion of the segments or slightly extend beyond this inside, this extension not extending beyond the ends of the upstream and downstream edges. The openings 10 are more or less centered on the segments relative to the axis of the machine, that is, the distances measured along the axis of the machine between each end of opening 10 on the corresponding edge are essentially equal. A shift of the openings along the axis of the machine relative to that centered position can be envisaged so that the openings do not encroach upon the branches of the upstream and downstream edges.

The end of segment 8a is profiled so as to fit the blade 4 located at the joint between segments 8a and 8b. The same holds for the end of segment 8b. Indeed, segments 8a and 8b each possess a portion 11a or 11b of which the profile corresponds with that of the blade 4. The ends of segments 8a and 8b also possess, in addition to the portion corresponding with the blade, portions 12a/12b on both sides of the portion 11a/11b and of which the profiles correspond so as to close the joint upstream and downstream of the blade. These portions 12a and 12b of the joint upstream and downstream of the blade are straight lines. The joint upstream of the blade (on the left in FIG. 2) is at an angle relative to the edge of the ferrule which is thus formed, of approximately 45°.

Figure 3:
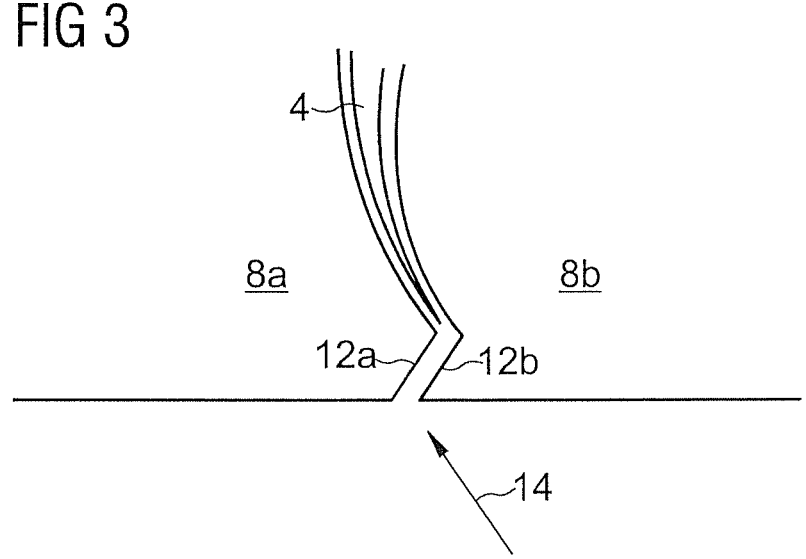
FIG. 3 is a schematic view from above the joint between two segments of the ferrule of FIG. 2.

This geometry is better illustrated in FIG. 3 which is a top view of the joint between two segments of the ferrule. Only a portion of the blade 4 is represented, namely the upstream portion with the edge where the fluid impacts. The upstream edge of the two segments 8a and 8b are represented such that the joint at the periphery leads away from the blade and upstream of the blade. The angle of the portion of the right/straight joint 12a, 12b upstream of the blade is represented. The direction of the fluid flow coming from the stage of the compressor preceding the diffuser in question is represented by the arrow 14. As one can see, the direction of the portion of the straight joint upstream of the blade forms an angle close to perpendicular with the flow direction of the fluid. Such an arrangement aims to limit the erosion of the possibly acute angles of the joint by the fluid flow. It is therefore desirable that this angle is close to 90°, or at least greater than 45°.

The arrangement of the segments relative to their joint at one blade can be summarized by the segments having such dimensions that the joint between two segments is located at one blade and fits the profile of the blade. Advantageously, the portion of the joint upstream of the blade is oriented such that it forms an angle of at least 45° with the axis of the machine. This measurement also applies to the portion of the joint downstream of the blade.

A certain play is foreseen between portions 11a, 11b of the ends of the segments and the profile of the blade to enable application of a glue or elastomer between the joint and the blade to the couple the blade mechanically to the two adjacent segments and to tighten that coupling. The play that is necessary for the application of such a material depends on the material and on the application method. This play is typically on the order of a millimeter.

Once one or all the segments of the ferrule are in place relative to the blades, the latter are attached relative to the segments by application of a glue or an elastomer between the profile of the blade and opening of the corresponding segment. This material can be applied from the outside of the segment at the play between blade and opening and/or from the inside of the segment at the play between the blade and opening and at the portion of the projecting blade if such is the case.

The presence of the joint between the segments at the blade as described before it is advantageous from an aerodynamic point of view. Indeed, the outer surface of the ferrule constructed like that has as general objective to delimit the fluid flow propelled by the preceding stage or stages of the compressor. The described arrangement has the advantage that each track of fluid passing between the two neighboring blades is delimited at the bottom by a section of the ferrule free from the joint. At the blade, the joint is less likely to perturb the fluid flow noticeably as a large portion of the joint closely envelops the blade similar to the openings into which the neighboring blades are inserted. The part of the joint upstream of the blade, which is likely to perturb the flow in the event of a projection or misalignment, is strongly reduced relative to a joint on the entire ferrule. The perturbation possibly caused by that portion of the joint remains very limited that way.

Figure 4:
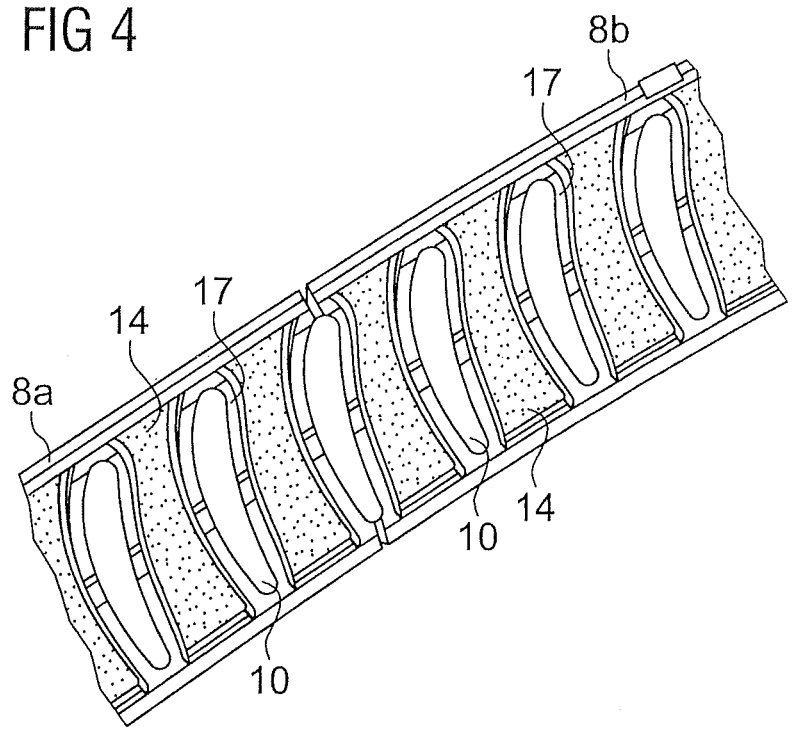
FIG. 4 is a view of the lower side of the two portions of the segments of the ferrule with their joint according to the present application.
Figure 5:
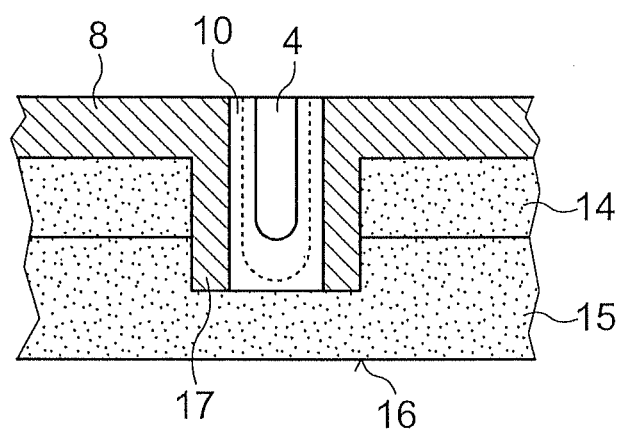
FIG. 5 is a cross section of an opening of the segment of the ferrule, the cross section being perpendicular to the general axis of the opening.

The openings 10 carried out in the segments and into which the lower ends of the blades are intended to fit can be reinforced by an extension with a covering material relative to the inside of the ferrule. Two sections of the segment possessing such reinforcements are illustrated in FIG. 4. This figure is a view of the inside of the two segments 8a and 8b according to the invention. One can see openings 10 carried out on the segment 8. These openings are reinforced or extended by an extension 17 of opening 10 from the inside of the segment. This extension 17 acts as a sheath of which the open section corresponds with those of the opening and of the blade. Similarly, the joint between the two segments possesses an extension corresponding to the profile of one side of the blade as each segments end. FIG. 5 is a cross-section of an opening 10 of the segment 8 in FIG. 4. That cross-section very well illustrates the extension 17 of the opening 10 projecting from the inside of the segment 8. Also represented is a portion of the blade 4 to be inserted into that opening 10. The material applied between the opening and the blade serving to couple them is presented by dots. This extension 17 is, however, shorter than the extensions of the upstream and downstream edges (not visible in FIG. 5) in order to have to the space for the abradable material 15 intended to form a contact surface 16 networks together with the lips of the rotor (not represented in this figure). A first layer 14 of another material such as blocks of low-density polymer foam (for example foam of polymethacrylimide, polyurethane or polyetherimide). The density of such a material is lower than that of the material that forms the abradable coating 15 deposited later.

Figure 6:
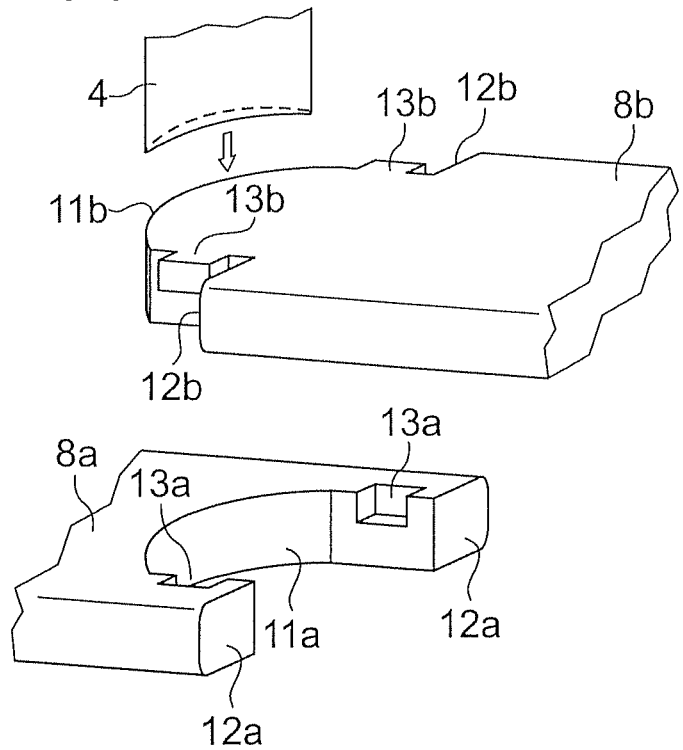
FIG. 6 is a view of a portion of a segmented ferrule according to an alternative embodiment of the present application.

A first alternative for the design of the joint between two segments as shown in FIG. 2 is illustrated in FIG. 6. It shows a view of the two segments 8a and 8b of which the ends forming the joint between them when they are assembled possess coupling means with a positive contact. Each end possesses, as in the design in FIG. 2, a portion 11a or 11b of which the profile corresponds with that of the blade 4. The right end of the segment 8a has a profile with the general shape of "U" of which the opening is directed toward the other segment 8b with which to join. The base of the "U" is formed by the portion 11a corresponding with the profile on the back of blade 4. The two branches of the "U" are straight lines and each possesses a recess 13a in the shape of a parallelepiped rectangle ending on the upper side or outside of the branch. The two branches each end on a surface contact plane 12a. The left end of the segment 8b has a profile that corresponds with the end that corresponds with the segment 8a, namely a general profile in the shape of a "U" of which the base is directed toward the segment it is to join. It possesses a portion 11b corresponding with the profile side on the front of blade 4 and two right channels, on both sides of the portion 11b, these right channels each possess a projection 13b in the shape of a parallelepiped rectangle. The left end of the segment 8b also possesses two sections planes and perpendicular to the upstream and downstream edges, each forming an intersection on an upstream or downstream side and the corresponding right channel. The projections and the recesses have corresponding shapes and each possess to perpendicular surfaces capable of being in positive contact with the corresponding surfaces so as to prevent shifting the two segments in a direction at an angle with the arc of the circle of the ferrule and in a direction that is perpendicular to the circle, in a direction that corresponds with a relative movement in which segment 8b shifts lower relative to segment 8a.

The projections and the recesses provide a mechanical coupling with a positive contact between the two segments. Their coupling works by a relative movement between the two segments, perpendicular to the arc of the circle. Indeed, the segment 8a is putting the plays by a vertical upward movement in Figure, that is, a movement relative to segment 8b directed toward the outside of the circle formed by the segments. The recesses 13a of segment 8b open up toward the outer surface of the segment and have a constant section along the axis of engagement of the projections with the recesses. The projections 13b can thus engage the corresponding recesses to abut against the bottom of the recesses. This type of coupling provides exact positioning of the segments and a rigid coupling while allowing a certain relative displacement between the segments. Such relative displacements may take place because of the difference in expansion between the outer ferrule, the blades and inner ferrule. This is particularly true when the inner ferrule is of a composite material presents an expansion coefficient that differs from that of the material of the blades and of the inner and outer ferrule, usually of a metallic material. The relative movements that are possible between the segments will depend on the projections and less recesses. The coupling between the blade 4 and the portions 11a and 11b of the segments is usually done by application of a glue or elastomer providing a connection that is tight and flexible. The same holds for the coupling of the other blades with each segment.

Figure 7:
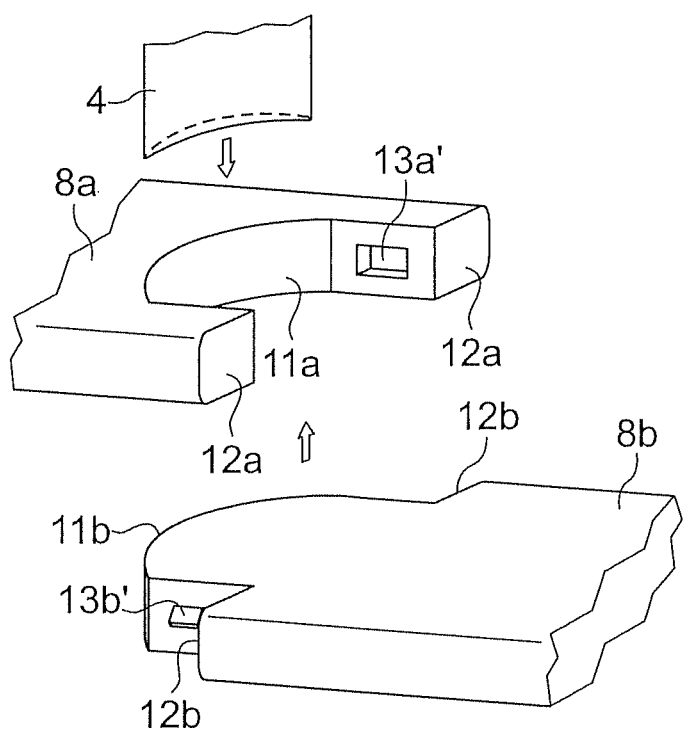
FIG. 7 is a view of a portion of a segmented ferrule according to another alternative embodiment of the present application.

A second alternative for the design of the joint between two segments as shown in FIG. 2 is illustrated in FIG. 7. It is similar to that of FIG. 6 with the differences that the engagement of the two segments 8a and 8b is done by force and that the provided coupling also works in a direction corresponding with the radius of the circle formed by the ferrule, and that in both directions. As with the design of FIG. 6, I the right end of the segment 8a has a general profile in the shape of a "U" of which the opening is directed toward the other segment 8b with which is to be joined, the base of the "U" being formed by the portion 11a corresponding with the profile on the side of the back of blade 4, the two branches of the "U" being straight lines and each possessing a recess 13a'. The insides of the branches are, however, at an angle here relative to the median plane of the outer surface of the ferrule so as to form a conic passage for the corresponding portion of the other segment 8b during the movement of the engagement. The angle formed by these sides with the median plane can have values between 10° and 45°, preferably, between 15° and 30°, for example in the order of 20°. Each recess 13a' corresponds to a protrusion of a parallelepiped shape from the insides of the branches of the "U". Similar to the design of FIG. 6, the left end of the segment 8b has a profile corresponding with the corresponding end of segment 8a, namely a general profile in the shape of a "U" d of which the base is directed toward the segment with which it is to be joined. It possesses a portion 11b corresponding with the profile side of the front of the blade 4 and two right channels, on both sides of the portion 11b, each of these right channels possessing a projection 13b'.

The right channels are at an angle relative to the medium plane of the outer surface of the ferrule similar to the insides of the "U" of the corresponding end of the segment 8a. Typically, the angle of the information is identical on both sides but difference in commissions may also be envisaged. The projections 13b' have a section along a tangential to the circle formed by the ferrule which is triangular. This triangular section essentially corresponds to a triangle rectangle so as to form a locking or engagement edge with the corresponding edge of the recess 13a'. Generally, the projections 13b' possess an outer surface (that is, opposite of the inner surface corresponding with the branch of the "U" of segment 8a) at an angle relative to the outer surface of the right channel so as to protrude from the outside toward the inside of the circle formed by the ferrule. The projections 13b' also possess a locking edge essentially parallel to the tangential to the circle, this edge being located under this angled surface so as to work together at the bottom with a corresponding surface of the recess 13a'. The projections 13b' each also possess at least one surface essentially perpendicular to the tangent to the circle that works together at the bottom with the corresponding surface of the recess so as to prevent shifting of the segments in a direction corresponding to the tangent to the circle.

The engagement of the two segments 8a and 8b is done by a movement of the segment 8b toward the segment 8a from the inside toward the outside of the circle of the ferrule and in a direction essentially corresponding to the radius of the circle. The angled surfaces of the projections 13b' enter into contact with the insides of the two branches of the "U" of the segment 8a. The segment 8b must therefore be submitted to an effort enabling a deformation of the branches and/or of the projections until the latter can rest in the corresponding recesses 13a'. At that moment, the locking edges of the angled surfaces of the projections 13b' work together with the corresponding surfaces of the recesses 13a' and prevent disengagement of the segment 8b toward the inside of the ferrule (in fact toward the bottom in FIG. 7) relative to segment 8a. A movement of the segment 8b toward the inside of the ferrule (in fact toward the top in FIG. 7) is presented as by the contact of the angled surfaces of the right channels of the "U" of the segment 8b with the corresponding angled surfaces of the branches of the "U" of the segment 8a.

These two alternatives for the design of FIG. 2 are given as an example and other alternatives for these examples can well be envisaged.

The ferrule formed by the assembly of its different segments thus presents the advantages of deformability so as to compensate for the differing expansions, particularly when the ferrule is of a different material than the outer ferrule, for example of a composite material. It also has aerodynamic advantages similar to those of a ferrule in one piece.

The blades can be made of the same material as the inner ferrule, particularly of composite materials. In that case, it is advantageous to realize a sector of the diffuser in one piece such as illustrated in FIG. 8. The sector 18 of FIG. 8 is composed of five blades 4' of the same material as a segment of the outer ferrule 20 and a segment of the inner ferrule 8'. Similar to the segments of the inner ferrule illustrated in FIG. 2, the segment of the inner ferrule 8' is designed so as to the joint with an other neighboring segment at the level of the profile of the blade located exactly at the joint. Indeed, the right end of the segment 8' stops at the side of the back of the last blade of the right side, and the left end of the segment 8' stops beyond the inside of the last blade on the left side and possesses a profile that corresponds with the profile of the back of the blade corresponding with the neighboring sector (not represented; preferably, the sectors are all identical). That way, the joint between the segments of the inner ferrule is always at the level of the profile of a blade and hence provides, similar as with the ferrule described in the preceding figures, a flow that is very little perturbed by the joint making relative movements between the segments of the inner ferrule inevitable in view of the temperature gradients and the differences between the materials used for the diffuser and the stator.

The profiles at the level of the joint as illustrated in FIGS. 2, 3, 6 and 7 can be applied at the sector of the ferrule as described before. The segment of the outer ferrule possesses straight ends in contrast with the inner segment. Indeed, in the case of the realization of the diffuser by sectors made entirely of composite materials such as illustrated in FIG. 8, the segments of the outer ferrule are attached by various means of attachment to a stator usually of a metallic material. In the case of FIG. 8, the outer segment possesses upstream and downstream edges that can be slid into the corresponding two grooves of the stator. That way, the outer segments are rigidly coupled to one another and are less susceptible to problems of projection at the level of the joint than the inner segments. Depending on the used attachment technique, it can, however, prove to be useful to apply the same measure to the outer segments as to the inner segments.

I claim:

1. An inner ferrule of a stator with blades of an axial turbomachine, the inner ferrule comprising:
   at least two segments having the general form of an arc of a circle and intended to be arranged end to end so as to form the ferrule, each segment including on the outside a plurality of openings arranged at regular distances along the general arc of the circle of the segment, into each of which the end of one of the blades of the stator is intended to fit;
   wherein each end of the segment possesses a section of which the profile essentially corresponds with that of the end of the corresponding blades when the segment is placed on the blades of the stator, so that a joint between two adjacent segments corresponds with the profile of the corresponding blade;
   wherein the joint comprises:
   a central portion corresponding with the blade;
   two intermediate straight portions, one on each side of the central portion, the straight portions being generally parallel to the edges of the segments; and
   connecting means that extend between the intermediate portions and the corresponding edge.

2. The inner ferrule according to claim 1, wherein the ends of the segments are profiled to match the contours of the blades to the right of the joint between the segments when the segments are placed on the blades of the stator.

3. The inner ferrule according to claim 1, wherein the segments possess an upstream edge and a downstream edge relative to the fluid flow in the turbomachine, the part of the joint that envelops the blade being at a distance from the upstream edge and the downstream edge.

4. The inner ferrule according to claim 1, wherein a coupling at a joint between the blade and the segments is provided by application of an elastomer during assembly of the segments on the blades.

5. The inner ferrule according to claim 1, wherein the parts of the joint downstream and/or upstream of the blade consist of the connecting means having a positive contact on each segment on both sides of the joint, the connecting means providing a coupling generally in a direction that is tangential to the circle of the ferrule.

6. The inner ferrule according to claim 5, wherein the connecting means form part of the segments on both sides of the joint and work by fitting the adjacent segments together in a generally radial direction.

7. The inner ferrule according to claim 5, wherein the connecting means are of the same material as the segments.

8. The inner ferrule according to claim 5, wherein the connecting means are foreseen at a portion of the joint that is generally parallel to the upstream and downstream edges of the segments.

9. The inner ferrule according to claim 5, wherein the connecting means contain at least one projection on one segment and a recess on an adjacent segment, the projection and the recess having corresponding geometric shapes such that the projection fits together with the recess to provide the coupling.

10. The inner ferrule according to claim 9, wherein the recess opens up onto one of the outer and inner surfaces of the segment.

11. The inner ferrule according to claim 9, further comprising:
    an abradable material coupled to an inside portion of the segments for contacting a portion of a rotor.

12. The inner ferrule according to claim 1, wherein the segments are formed of a composite material containing a resin combined with fibers of carbon and/or iron.

13. The inner ferrule according to claim 1, wherein the section of each segment has the general shape of a U, of which the open portion is directed toward the inside of the circle of the ferrule.

14. The inner ferrule according to claim 1, further comprising:
    a base contained by each segment for limiting the flow between the blades of the stator;
    openings in the base into which the ends of the blades are intended to fit, each opening extending radially inward from the base.

15. The inner ferrule according to claim 14, further comprising:
    a covering material for covering the base.

16. The inner ferrule according to claim 15, wherein the covering material is a low-density polymer foam.

17. An annular stator with blades for an axial turbomachine, the stator comprising:
    at least two sectors configured for arrangement end to end, each sector realized in one piece and containing an outer segment and an inner segment, each segment having the general shape of the arc of a circle corresponding with an outer and inner ring, respectively, of the stator;
    a plurality of blades arranged between the outer segment and the inner segment, the blades being spaced at regular distances along the length of the outer and inner segments;
    wherein one end of each inner segment corresponds with the outside of the last blade of the sector on that end, and the other end of such inner segment includes a section of which the profile essentially corresponds with the outer profile of a proximal blade of an adjacent sector, such that the joint between two adjacent sectors corresponds with the outside of the corresponding blade;

wherein the joint comprises:
a central portion corresponding with the blade;
two intermediate straight portions, one on each side of the central portion, the straight portions being generally parallel to the edges of the segments; and
connecting means that extend between the intermediate portions and the corresponding edge.

* * * * *